Aug. 2, 1960     G. A. HOLCOMB     2,947,503
EJECTION SEAT FOR AIRCRAFT AND THE LIKE
Filed May 9, 1958
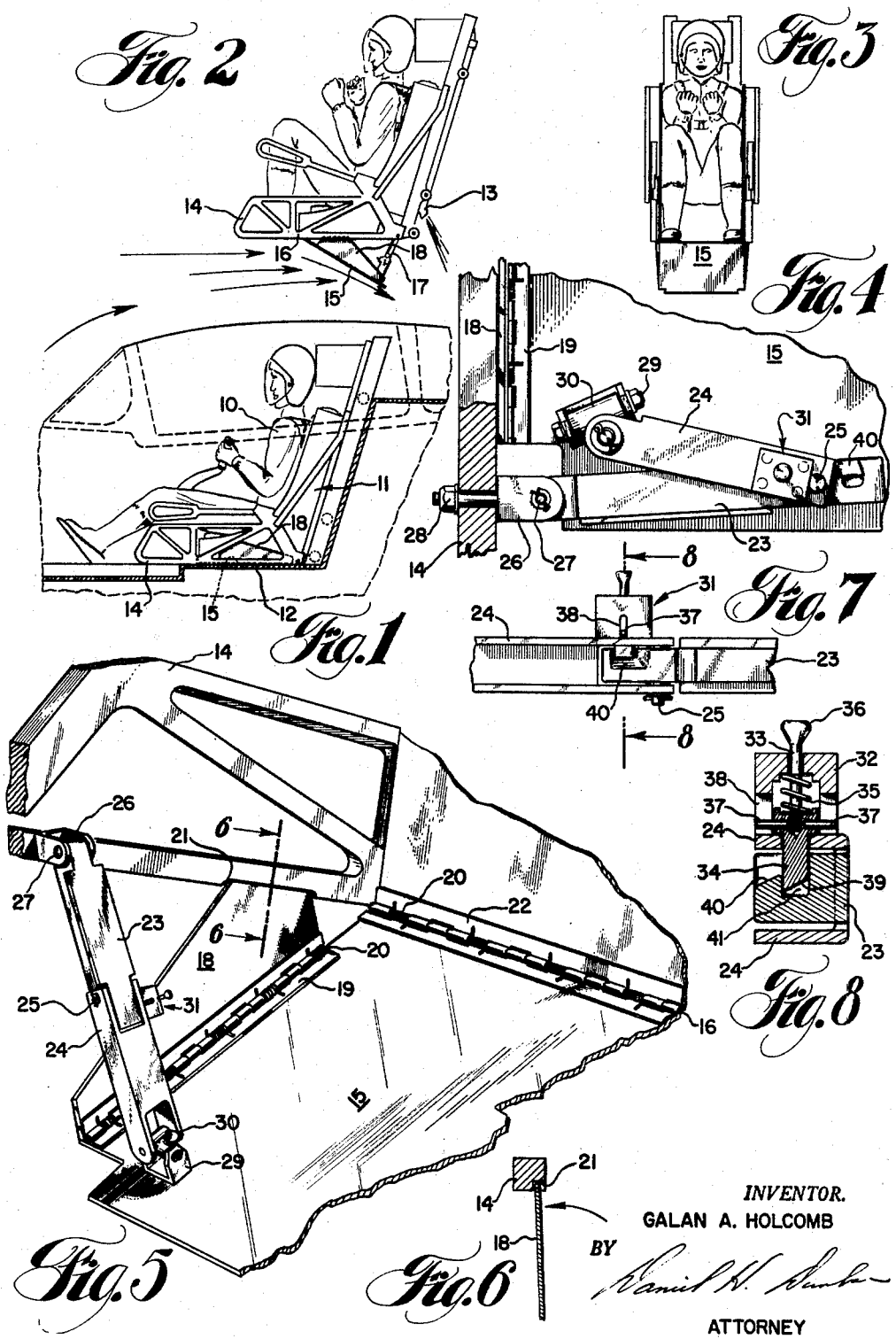
INVENTOR.
GALAN A. HOLCOMB
BY
ATTORNEY

United States Patent Office 2,947,503
Patented Aug. 2, 1960

2,947,503

EJECTION SEAT FOR AIRCRAFT AND THE LIKE

Galen A. Holcomb, Columbus, Ohio, assignor to North American Aviation, Inc.

Filed May 9, 1958, Ser. No. 734,242

7 Claims. (Cl. 244—122)

This invention pertains generally to an ejection seat for aircraft and the like, and relates particularly to an ejection seat having novel means provided therewith for effecting personnel survival in low-altitude, high velocity escape situations, and for effecting an improved emergency escape trajectory.

Present day military aircraft are typically provided with one or more powered ejection seats for use in catapulting operating personnel from within the vehicle in those emergency situations which require escape action. The rocket or ballistic charge typically utilized with such seats has heretofore been generally sufficient for effecting personnel survival in high-altitude escape situations, and for causing the seat to clear the empennage portion of the airplane during all contemplated escape situations. Further, the recognized upper limit of catapult force magnitudes which may be applied to the human body have not been exceeded by the catapult charges provided therein. However, with the advent of high-performance aircraft and the increased velocities associated therewith, difficulty has been experienced with respect to effecting ejection seat empennage clearance through use of catapult forces which are within the limits of personnel tolerance. Such is particularly true with respect to ejection seats catapulted from an airplane at ejection angles which induce a negative lift characteristic at the underside of the seat.

To overcome the above-mentioned limitations, I have discovered that the escape trajectory of a catapulted ejection seat may be substantially improved with respect to the problems of personnel low-altitude, high velocity escape survival and empennage clearance by providing that ejection seat with an underside lift surface. Additionally, I have discovered an improved arrangement and technique for placing the lift surface in its operating position.

Accordingly, it is an object of this invention to provide an ejection seat for aircraft and the like which has a survival capability in low-altitude, high-velocity escape situations with respect to personnel utilizing such seat.

Another object of this invention is to provide a powered aircraft ejection seat having means incorporated therein for improving the emergency escape trajectory of the seat.

Another object of this invention is to provide an ejection seat installation having features which provide for improved empennage clearance capability with respect to an emergency escape sequence.

Another object of ths invention is to provide means for establishing positive underside lift for an ejection seat to be used in an emergency escape sequence.

Another object of this invention is to provide an ejection seat installation having means for correcting those negative lift conditions which would otherwse be inherent therewith.

A still further object of this invention is to provide an improved aircraft ejecton seat havng underside lift means which function in a manner which is entirely compatible with ejection seat stability.

Another object of this invention is to provide an aircraft ejecton seat having underside lift means which are actuated for use by the inherent inertia characteristics thereof.

Another object of this invention is to provide underside lift means for an aircraft ejection seat which has minimum space requirements with respect to seat installation.

Another object of this invention is to provide an improved aircraft ejection seat which has a minimum of components, whch may be economically manufactured, which may be easily maintained, and which has a high degree of operational reliability.

Other objects and advantages of this invention will become apparent during consideration of the drawings and descriptions.

In the drawings, wherein like reference numerals are used to designate like components through the same:

Fig. 1 is a sectional view of a portion of an airplane showing an ejection seat positioned therein which incorporates the features of this invention;

Fig. 2 is a side elevational view of the ejection seat of Fig. 1 showing features of this invention in their operational position;

Fig. 3 is a front elevational view of the ejection seat of Fig. 2;

Fig. 4 is a plan view of a portion of the ejection seat illustrated in Fig. 1;

Fig. 5 is a perspective view of a portion of the ejection seat illustrated in Figs. 2 and 3;

Fig 6 is a sectional view taken along the 6—6 of Fig. 5;

Fig. 7 is an elevational view of a portion of the lock bar means illustrated in Fig. 5; and Fig. 8 is a sectional view taken along the line 8—8 of Fig. 7.

Fig. 1 illustrates, in outline form, a fuselage portion of a high performance airplane, and also illustrates a powered ejection seat 11 contained therein. Seat 11 is typically located on the floor 12 of the crew compartment, and is utilized by the pilot 10 as a support during normal aircraft operation. Seat 11 is also utilized by the pilot 10 for effecting an escape from within the airplane in an emergency situation. During normal flight, seat 11 is secured to structural components of the airplane and remains substantially in a fixed position.

Rocket means 13 (Fig. 2) is attached to seat 11 for use in catapulting the seat from within the airplane in an emergency situation. Heretofore, the rocket charge typically provided in component 13 has been sufficient to cause the ejection seat to be catapulted clear of the empennage portion of the airplane when the airplane is moving in a forward direction at a high velocity. Also, the forces imparted to the typical seat by the rocket means have generally been sufficient for effecting empennage clearance without imparting adverse stresses to the body of the pilot. However, with respect to low-altitude emergency escape situations and with respect to recently developed aircraft having supersonic velocity operating capabilities, such catapult charges have proved ineffective in many situations for accomplishing empennage clearance. Also, it has been generally recognized that any substantial increase in catpult force would subject the occupier of the catapulted seat to severe personal injury. To overcome such deficiencies, it is the purpose of this invention to provide an injection seat with an underside lift member as described herein.

A suitable lift surface 15 is preferably attached to a structural portion 14 of seat 11 by a pivot connection at 16, and is illustrated in a collapsed position in Fig. 1.

Fig. 2 illustrates seat 11 at a position in its empennage clearance trajectory with the lift surface 15 moved to its extended position. Also illustrated in Fig. 2 are lock bar means 17 and side plate means 18. Components 17 and 18 are provided for use in retaining lift surface 15 in its extended position.

During normal aircraft operation, lift surface 15 is maintained in the retracted or collapsed position illustrated in Fig. 1. In that view, side plate 18 is urged against the inside vertical surface of frame 14, and the collapsed lift member 15 is maintained in a condition suitable for immediate extension. In an emergency situation the pilot is secured in a proper position in seat 11, and the rocket 13 is fired as a step of the escape sequence. As seat 11 commences its movement from within the crew compartment of the airplane, inertia forces cause plate 15 to pivot with respect to the underside of seat 11. Pivoting of lift member 15 about the axis 16 may be additionally accomplished through the use of supplementary spring means hereinafter described. Before seat 11 is completely separated from the airplane, inertial action will cause the plate to move to the position illustrated in Fig. 2 and will cause the lock bar means 17 to assume its extended operative position.

A preferred arrangement for attaching components 15, 17 and 18 to the seat 11 is illustrated more clearly in Figs. 4 through 8. Side plates 18 may be pivotally attached to lift member 15 by hinge means such as 19. Torsion spring means 20 may be utilized with hinge means 19 to maintain each plate 18 substantially in the position illustrated in Fig. 1. A comparable hinge means 22 may be used to secure the forward edge of lift surface 15 to seat 11. Torson spring means such as 20 may also be utilized with hinge connector 22 for the purpose of urging lift plate member 15 into its operative position, however such use is not absolutely required.

Lock bar means 17 functions to restrain lift member 15 in its operative position, and is illustrated best in Figs. 4 and 5. It is preferably comprised of an upper section 23, a lower section 24, and pivot means 25 for connecting the lock bar sections to each other. The upper section 23 is attached to structure 14 of seat 11 through use of a swivel bracket 26 and a pivot pin 27. Bracket 26 is preferably pivotally secured to frame 14 by fastener means 28 so that components 26, 27 and 28 function as a universal-type joint.

The lower section 24 of lock bar means 17 is preferably pivotally secured to lift member 15 through the use of swivel bracket 29 and the universal-type pivot 30. Fastener means (not shown) are used to pivotally attach bracket 29 to plate 15. Such fastener means may be identical in form to the fastener means 28.

Lock bar 17 is provided with latch means 31 for the purpose of restraining bar 17 in its extended condition. As illustrated in Figs. 7 and 8, latch means 31 is essentially comprised of a housing 32, a pin 33 contained in and projecting from the housing, and a stud portion 34 secured to the pin. Spring means 35 is provided to urge the latch components toward their Fig. 8 position, and will additionally function to maintain such components in that position. A knob 36 may be attached to pin 33 for convenience, and housing 32 is preferably attached to section 24 of the lock bar means. Pins 37 are secured to stud 34 and cooperate with the slots 38 provided in housing 32 for limiting the rotational movement of stud 34. A sloped surface 39 is provided on stud 34 for cooperation with the sloped surface of the channel 40 provided in lock bar section 23. Channel 40 terminates at recess 41 and recess 41 is provided to receive a portion of stud 34.

When the seat 11 is catapulted from within the airplane, and when lift member 15 is caused to pivot with respect to the seat, lock bar means 17 and side plate means 18 function as follows. The portions 23 and 24 are caused to rotate with respect to each other about pivot 25, and simultaneously therewith, the same portions are caused to rotate with respect to brackets 26 and 29 through their pivot connection thereto. Also, brackets 26 and 29 are caused to rotate with respect to frame 14 and lift member 15 respectively. During such lock bar motions, stud 34 of the latch means is brought into contact with the lower surface of channel 40 and is moved up that surface toward the recess 41. When lock bar means 17 has been moved to its Fig. 5 position, spring means 35 will urge the lower extreme of stud 34 into recess 41. This results in lock bar means 17 being restrained in its extended position by the latch means.

As lift member 15 is pivoted about structure 14, the side plates continue to bear against the inside vertical surface of structural portion 14. This is accomplished through the continuous action of spring means 20 provided in conjunction with the hinge components 19. As lift member 15 approaches its fully extended position, spring means 20 urge an edge portion of each side plate member 18 into cooperation with the notch 21 provided in the frame member. In this manner side plates 18 will function to transmit a portion of the aerodynamic load placed upon lift member 15 into the frame 14. Such side plates supplement the load transmitting capability of lock bar means 17.

From the foregoing description it may be noted that this invention has provided an improvement for powered ejection seats used in aircraft applications. By providing an ejection seat with the underside lift surface of this invention, advantages may be realized with respect to improving the ejection seat low-level emergency escape capability, with respect to improving the emergency escape trajectory of the seat, with respect to providing an improved empennage clearance capability, and with respect to providing positive underside lift for an ejection seat having a negative underside lift characteristic. The means provided in connection with this invention requires a minimum of space for installation, has a minimum of components, may be economically manufactured and maintained, and has a high degree of operational reliability. Additionally the invention described and claimed herein advantageously utilizes inertial characteristics inherent in the invention, and is entirely capable with ejection seat stability.

It is understood that the forms of the invention herewith shown and described are to be taken as preferred embodiments of the same, but that various changes in the shape, size and arrangement of parts may be resorted to without departing from the spirit of the invention or the scope of the subjoined claims.

I claim:

1. Emergency escape apparatus for aircraft and the like which includes a seat, lift plate means attached to said seat at the underside thereof and movable from a retracted position to an extended position for providing said seat with an empennage clearance capability, and rocket means attached to said seat to provide a primary seat-lifting force, said lift plate means providing a secondary seat-lifting force when said seat is moved in an air stream.

2. Emergency escape apparatus for aircraft and the like which includes: an ejection seat, lift plate means connected to said seat at the underside thereof and movable relative thereto from a retracted position to an extended position, rocket means attached to said seat for moving said seat and for inducing inertial forces to move said lift plate means to said extended position, and means connected to said lift plate means and connected to said ejection seat for restraining movement of said lift plate means from said extended position toward said retracted position, said lift plate means imparting added lift to the underside of said seat when extended and when said seat is moved forwardly in an air stream.

3. The ejection seat defined in claim 2 wherein said lift plate means is positioned substantially within the plan dimensional extremes of said seat when located in said retracted position.

4. An ejection seat for aircraft and the like which includes a structural portion, a movable surface member attached to said structural portion for creating added lift at the underside of said seat when said seat is moved forwardly in an air stream, pivot means located generally along the leading edge region of said surface member to attach said surface member to said structural portion, rocket means secured to said ejection seat for moving said ejection seat and for inducing movement of said surface member about said pivot means, and movable means attached to said surface member and having a portion pivotally connected to said structural portion for restraining movement of said surface member relative to said seat subsequent to initiating the action of said rocket means.

5. The ejection seat defined in claim 4 wherein said means for restraining said surface member includes lock bar means, said lock bar means including an upper section connected to said structural portion, a lower section connected to said surface member, and means connecting said upper and lower sections to each other.

6. The ejection seat defined in claim 4 wherein said means for restraining said surface member includes a rigid section pivotally connected to said structural portion, another rigid section pivotally connected to said surface member, and means pivotally connecting said rigid sections to each other.

7. In combination with an aircraft ejection seat having an underside negative lift characteristic during movement in an air stream and in an emergency escape trajectory, movable surface means for reducing the magnitude of said negative lift characteristic, means pivotally connecting said surface means adjacent the underside of said seat, and power means attached to said seat for moving said seat in said escape trajectory and for inducing pivoting of said surface means to an extended position, said movable surface means turning said air stream downwards with respect to said seat and thereby reducing the magnitude of said negative lift characteristic when extended and when said seat is moved forward with respect to said air stream and in said escape trajectory.

References Cited in the file of this patent

UNITED STATES PATENTS 2,829,850     Culver _____ Apr. 8, 1958

FOREIGN PATENTS 702,148     Great Britain _____ Jan. 13, 1954

OTHER REFERENCES

Aviation Week, Nov. 12, 1956, pages 71, 72, 74 and 77 relied on.